(12) United States Patent
Johnson, Jr. et al.

(10) Patent No.: US 6,869,120 B2
(45) Date of Patent: Mar. 22, 2005

(54) DASH BOX FOR A RECREATION VEHICLE

(76) Inventors: Charles Wade Johnson, Jr., 15625 Eagleview Dr., Charlotte, NC (US) 28278-8816; Michael Bartholomew, 9925 Providence Forest La., Charlotte, NC (US) 28270; Pavel Matousek, 10208-M Plum Creek La., Charlotte, NC (US) 28210

( * ) Notice: Subject to any disclaimer, the term of this patent is extended or adjusted under 35 U.S.C. 154(b) by 0 days.

(21) Appl. No.: 10/651,464

(22) Filed: Aug. 29, 2003

(65) Prior Publication Data

US 2004/0174034 A1 Sep. 9, 2004

Related U.S. Application Data

(60) Provisional application No. 60/406,790, filed on Aug. 29, 2002.

(51) Int. Cl.$^7$ ................................................ B60R 7/06
(52) U.S. Cl. ..................................... 296/37.12; 224/274
(58) Field of Search .............................. 296/37.1, 37.8, 296/37.12, 70; 180/90; 224/274

(56) References Cited

U.S. PATENT DOCUMENTS

| 2,789,861 | A | * | 4/1957 | Hudson ................... 296/37.12 |
| 4,989,767 | A | * | 2/1991 | Buschbom ................. 224/274 |
| 5,159,314 | A |   | 10/1992 | Wayne |
| 5,697,176 | A |   | 12/1997 | Kuni, Jr. et al. |
| 5,701,754 | A | * | 12/1997 | Choi et al. ............... 296/37.12 |
| 5,890,756 | A | * | 4/1999 | Pranger et al. .......... 296/37.12 |
| 6,125,566 | A | * | 10/2000 | McLaughlin ................. 40/737 |
| 6,582,002 | B2 | * | 6/2003 | Hogan et al. ............ 296/37.12 |
| 6,601,745 | B2 | * | 8/2003 | Tyrer .......................... 224/274 |

OTHER PUBLICATIONS

Buggies® Unlimited; "Golf Cart Accessories and Parts"; website listing; pp. 1–7; Published prior to Aug. 29, 2003.
Buggies® Unlimited; "Golf Cart Accessories and Parts"; website listing; pp. 1–6; Published prior to Aug. 29, 2003.

* cited by examiner

Primary Examiner—Lori L. Coletta
(74) Attorney, Agent, or Firm—Schwartz Law Firm P.C.

(57) ABSTRACT

A dash box is provided in a recreation vehicle including an occupant area, a cowl extending forward of the occupant area, and first and second spaced-apart front support posts extending upwardly from the cowl. The dash box includes a housing adapted for mounting between the first and second support posts of the vehicle. The housing includes joined walls which define a plurality of divided compartments for holding and storing items. The compartments are readily accessed by an occupant seated in the occupant area of the vehicle. A cowl-engaging stabilizing base carries the housing, and has a generally wedge-shaped portion adapted to fit within a space between the first and second support posts and a rear edge of the cowl.

19 Claims, 7 Drawing Sheets

DASH BOX FOR A RECREATION VEHICLE

TECHNICAL FIELD AND BACKGROUND OF THE INVENTION

This invention relates to a dash box for a recreation vehicle, such as a golf cart. The invention mounts directly in front of the vehicle's occupant area, and has multiple compartments for conveniently storing items such as score cards, pencils, golf balls, tees, sunglasses, cell phones, trash, cigarette butts, food, beverages, and the like. The invention also offers valuable surface area for prominently displaying corporate advertising, golfer names, club notices, and tee times.

Dash trays and dash covers for golf carts are well known in the prior art. These products typically extend between the front windshield posts and provide storage areas for lightweight, loose items. The prior art dash products are generally attached only at opposite ends and are poorly designed for carrying heavier loads, such as loaded coolers. In addition, these dash products have relatively little compartment space and offer a limited range of conveniences. In most cases, these products must be custom designed to fit the specific make and year of the golf cart, and are often difficult to install and remove.

The present invention addresses these and other limitations of the prior art by providing a dash box which securely mounts to the vehicle for ready and convenient access by occupants. The invention has a number of divided compartments and support structure capable of holding and storing a wide variety of items commonly used by golfers. The invention is quickly and easily installed and removed. Once installed, the invention is fully supported along its length and creates little vibration and rattling noise during operation of the cart.

SUMMARY OF INVENTION

Therefore, it is an object of the invention to provide a dash box for a recreation vehicle, such as a golf cart.

It is another object of the invention to provide a vehicle dash box which is effectively supported throughout its entire length.

It is another object of the invention to provide a vehicle dash box which includes multiple compartments for conveniently storing items such as score cards, pencils, golf balls, tees, sunglasses, cell phones, trash, food, beverages, and the like.

It is another object of the invention to provide a vehicle dash box which locates items for ready access by the occupants.

It is another object of the invention to provide a vehicle dash box which offers valuable surface area for displaying corporate advertising, golfer names, club notices, and tee times.

It is another object of the invention to provide a vehicle dash box which can be retrofit to all major manufacturers of golf carts.

It is another object of the invention to provide a vehicle dash box which does not create excessive vibration or rattling noise during operation of the vehicle.

It is another object of the invention to provide a vehicle dash box which is quickly and easily installed and removed from the vehicle.

It is another object of the invention to provide a vehicle dash box which can be quickly and conveniently cleaned using a water hose.

It is another object of the invention to provide a vehicle dash box which is molded of a durable plastic which will not scratch or damage items stored within the box compartments.

It is another object of the invention to provide a vehicle dash box which promotes proper disposal of cigarette butts, and reduces the cost and labor of litter collection.

It is another object of the invention to provide an improved recreation vehicle which incorporates a vehicle dash box according to the present invention.

These and other objects of the present invention are achieved in the preferred embodiments disclosed below by providing a dash box for a recreation vehicle. The vehicle has an occupant area, a cowl extending forward of the occupant area, and first and second spaced-apart front support posts extending upwardly from the cowl. The dash box includes a housing adapted for mounting between the first and second support posts of the vehicle. The housing includes joined walls which define a plurality of divided compartments for holding and storing items. The compartments are readily accessed by an occupant seated in the occupant area of the vehicle. A cowl-engaging base carries the housing, and has a generally wedge-shaped portion adapted to fit within a space between the first and second support posts and a rear edge of the cowl.

The term "wedge-shape" is used broadly herein to mean any structure that tapers from a relatively thick end to a relatively thin end.

According to another preferred embodiment of the invention, the cowl-engaging base has an upwardly turned front lip adapted to further secure the housing to the recreation vehicle.

According to another preferred embodiment of the invention, the housing has opposing end walls adapted to reside adjacent respective support posts of the recreation vehicle.

According to another preferred embodiment of the invention, the end walls of the housing include respective outwardly-extending flanges adapted for engaging the support posts to further secure the housing to the recreation vehicle.

According to another preferred embodiment of the invention, the housing has at least one pivoted lid removably covering an open top of at least one of the plurality of compartments.

According to another preferred embodiment of the invention, the plurality of compartments includes an insulated cooler compartment.

According to another preferred embodiment of the invention, the plurality of compartments includes a trash compartment.

According to another preferred embodiment of the invention, the trash compartment has a top wall which defines a slot for receiving items. The top wall contains the items inside the trash compartment during operation of the vehicle.

According to another preferred embodiment of the invention, the plurality of compartments includes a telephone holder.

According to another preferred embodiment of the invention, the plurality of compartments includes a removable ash tray.

According to another preferred embodiment of the invention, the plurality of compartments includes a beverage holder. The beverage holder defines a generally circular opening adapted for receiving a beverage container.

According to another preferred embodiment of the invention, a fold down tray is attached to the housing, and is pivotable between an open in-use position and a closed stowed position.

According to another preferred embodiment of the invention, means are provided for attaching an advertisement card to at least one wall of the housing.

In another embodiment, the invention is an improved recreation vehicle having an occupant area, a cowl extending forward of the occupant area, and first and second spaced-apart front support posts extending upwardly from the cowl. The improvement is a dash box including a housing mounted between the first and second support posts of the vehicle. The housing has joined walls defining a plurality of divided compartments for holding and storing items. The compartments are readily accessed by an occupant seated in the occupant area of the vehicle. A cowl-engaging base carries the housing and has a generally wedge-shaped portion adapted to fit within a space between the first and second support posts and a rear edge of the cowl.

According to another preferred embodiment of the invention, the housing has opposing end walls residing adjacent respective support posts of the recreation vehicle.

According to another preferred embodiment of the invention, means are provided for removably mounting the housing to the first and second support posts of the vehicle.

According to another preferred embodiment of the invention, the means for mounting includes outwardly-extending flanges located on opposing end walls of the housing and engaging respective first and second support posts of the vehicle.

According to another preferred embodiment of the invention, the means for mounting further includes resilient C-shaped post clips applied to respective first and second support posts and engaging the flanges of the housing to removably clamp the housing to the vehicle.

According to another preferred embodiment of the invention, the cowl-engaging base is formed separately from the housing. Alternatively, the cowl-engaging base and housing may be integrally formed together as a single unit.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
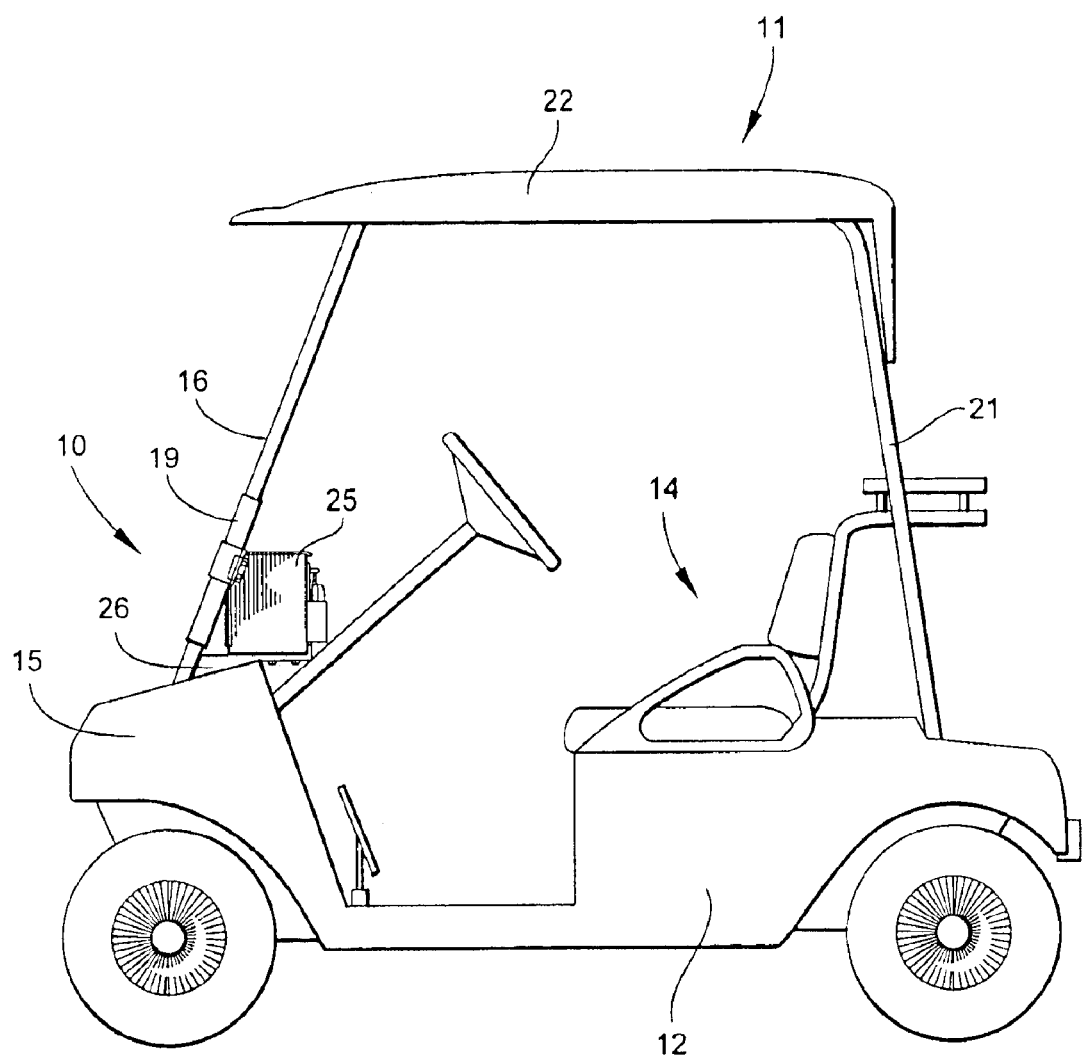
FIG. 1 is a side elevation of a golf cart incorporating a dash box according to one preferred embodiment of the present invention.

Referring now specifically to the drawings, a dash box according to the present invention is illustrated in FIG. 1, and shown generally at reference numeral 10. The dash box 10 is especially applicable for use in a recreation vehicle, such as a golf cart 11. Conventional golf carts 11 include a fiberglass body 12 defining an occupant area 14 with open sides, and a cowl 15 extending forward from the occupant area 14 to a front end of the cart 11. A pair of laterally-spaced front support posts 16 and 17 extend upwardly from the cowl 15 and define a frame for attaching a split-panel acrylic windshield (not shown). The windshield is secured to the front posts 16, 17 by respective clips 19 and 20. The front posts 16, 17 further cooperate with corresponding rear posts 21 (only one shown) to carry an overhead canopy 22.

Figure 2:
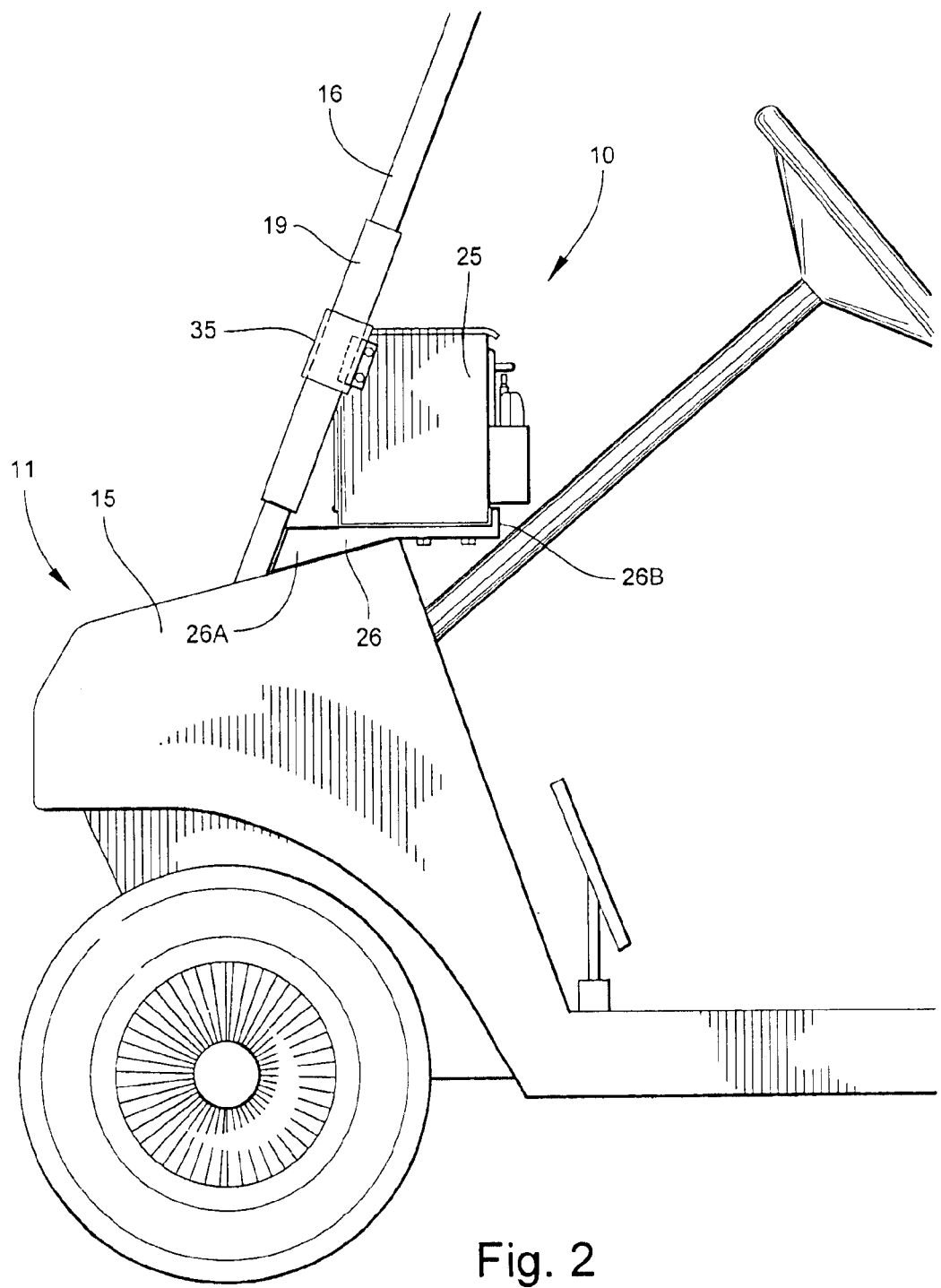
FIG. 2 is an enlarged fragmentary view of the golf cart showing the dash box mounted on an edge of the cowl.
Figure 3:
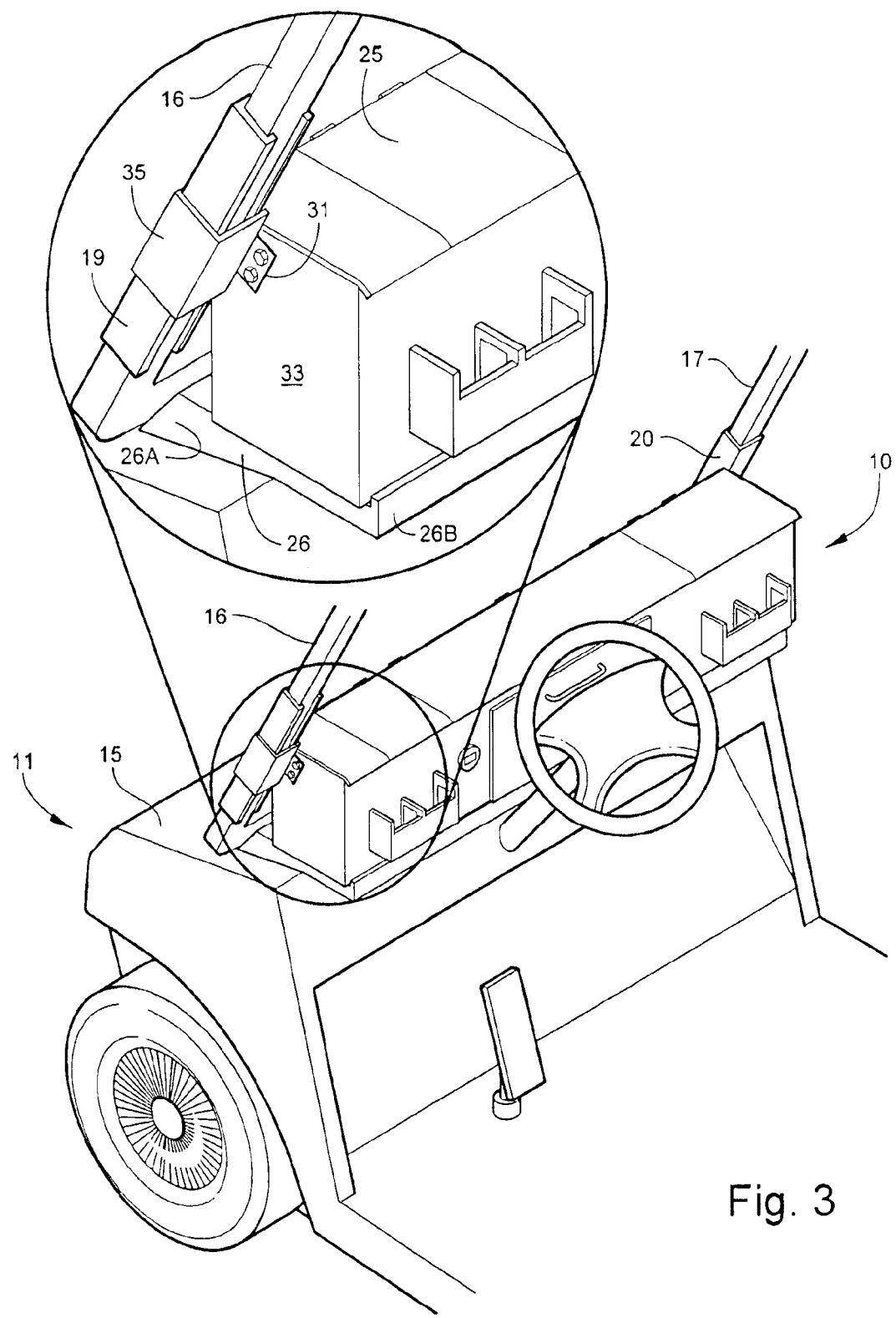
FIG. 3 is a fragmentary perspective view of the golf cart with a portion blown out and enlarged.
Figure 4:
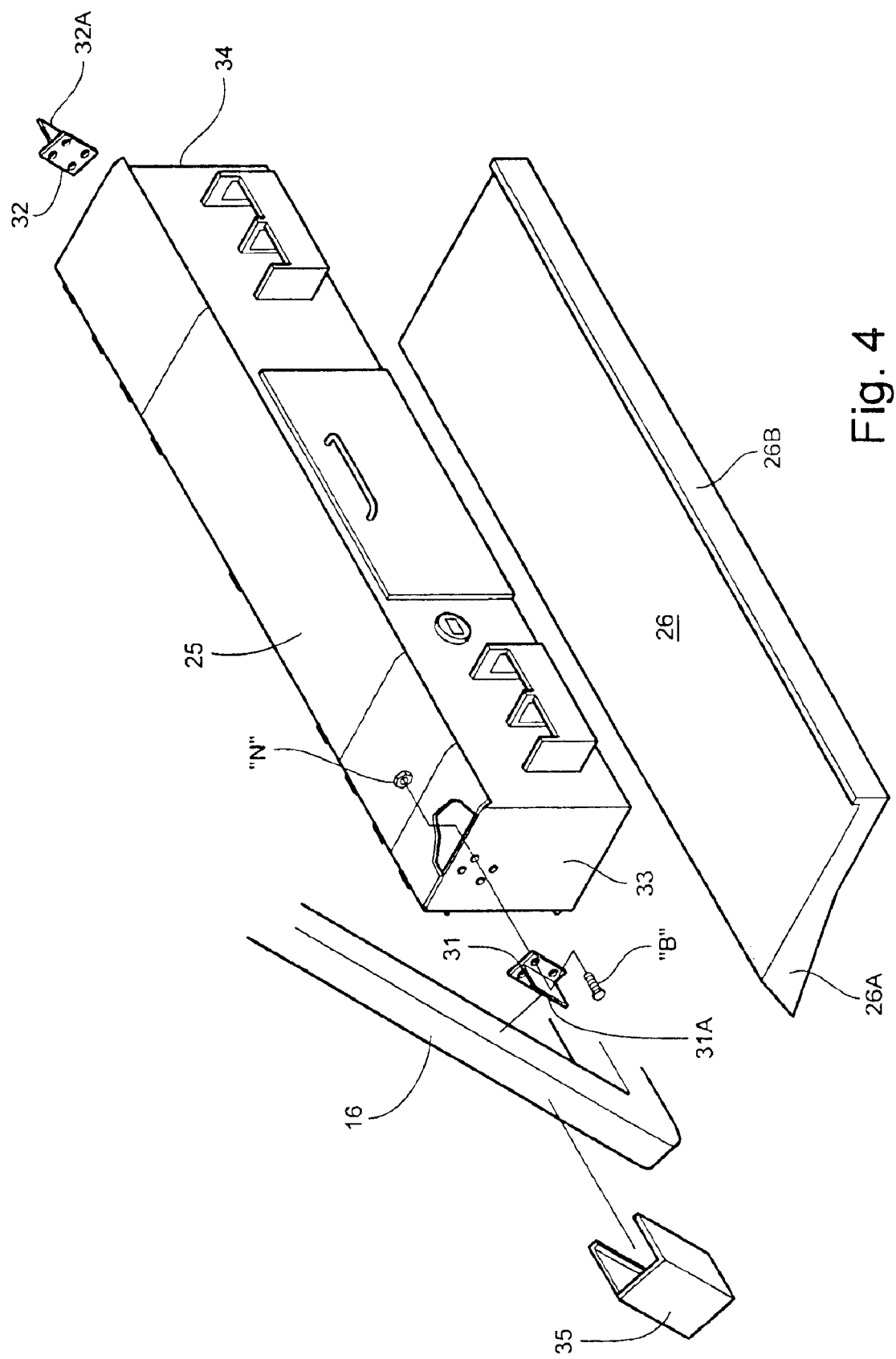
FIG. 4 is an exploded perspective view of the dash box, and showing the components for mounting the box to the cart.

As best shown in FIGS. 2, 3, and 4, the dash box 10 mounts between the front posts 16, 17 of the cart 11, and comprises a housing 25 and stabilizing base 26. The housing 25 is formed by joined walls defining a number of divided compartments, described further below, for holding and storing a variety of items. The compartments are specially designed and located for convenient, ready access by occupants of the cart 11. Preferably, the housing 25 is integrally molded of a lightweight, durable plastic which will not scratch or damage items stored in the compartments.

The stabilizing base 26 is formed separate from the housing 25, and has a generally wedge-shaped portion 26A custom designed to fit between the front support posts 16, 17 and rear edge 15A of the cowl 15. The wedge-shaped portion 26A engages the cowl 15 and provides relatively uniform load support laterally from one post 16 to the other post 17. To limit squeaking or rattling noises, the wedge-shaped portion 26A may include one or more thin rubber or fabric shocks (not shown) located between the base 26 and the cowl 15, and between the base 26 and the housing 25. The base 26 extends beyond a narrow end of the wedge-shaped portion 26A and has an integrally-formed front lip 26B for holding the housing 25 in position during operation of the cart 11. As best shown in FIG. 4, for added stability, mounting brackets 31 and 32 are attached to respective opposite end walls 33 and 34 of the housing 25, and have outwardly-extending flanges 31A and 32B which engage the front support posts 16 and 17 of the cart 11. The mounting brackets 31, 32 are arranged at an angle corresponding to the angle of the posts 16, 17, and are fixed to the housing 25 by complementary bolts "B" and nuts "N". Resilient, generally C-shaped post clips 35 are applied to respective support posts 16, 17, over the flanges 31A, 32A and windshield clips 19, 20 to releasably mount the dash box 10 to the vehicle 11. The dash box 10 is quickly and conveniently removed from the vehicle 11 by first detaching the post clips 35, 36 and then lifting the box 10 outwardly through the occupant area 14.

For still further stability, the stabilizing base 26 may be attached directly to the cowl 15 using suitable fasteners (not shown), or by gluing. The housing 25 and base 26 may likewise be attached together in a similar manner, or may be integrally-molded as a single unit. Alternatively, the housing 25 may be unattached to the stabilizing base 26 to facilitate its installation and removal. With the housing 25 removed, the base 26 provides a relatively level platform for carrying and supporting items.

Figure 5:
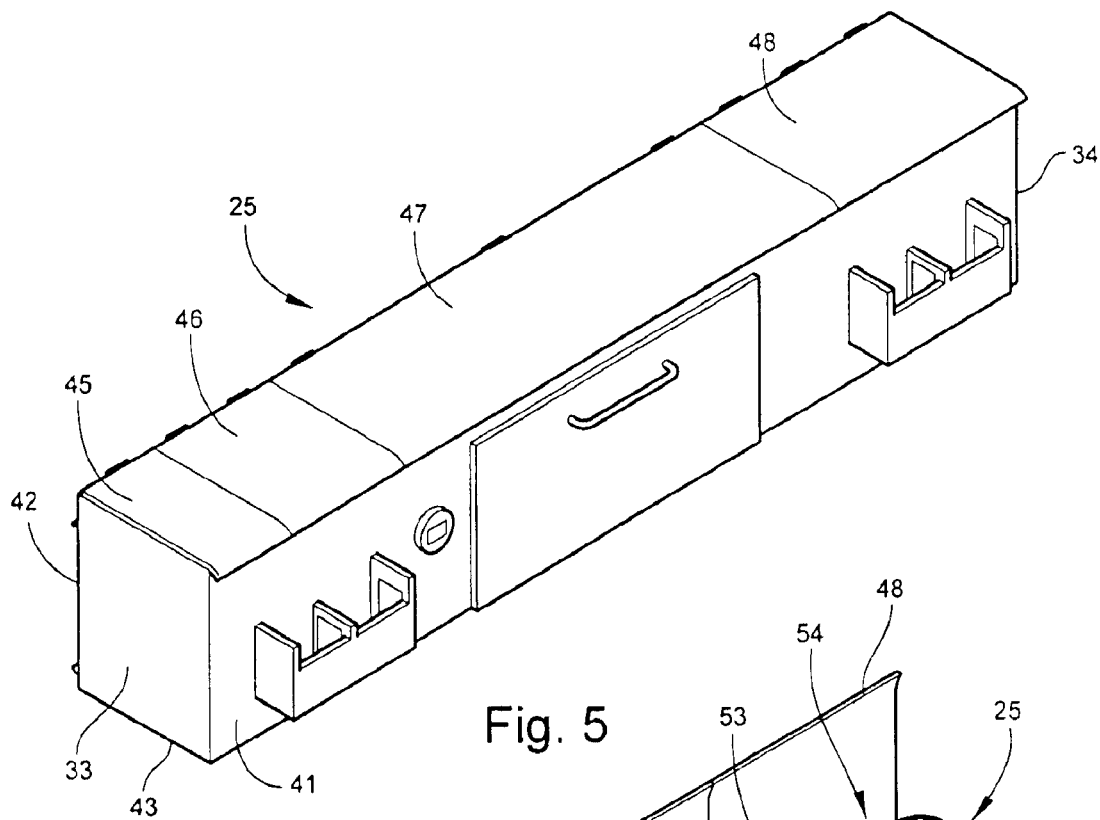
FIG. 5 is a perspective view of the dash box housing with the compartment lids and tray closed.
Figure 6:
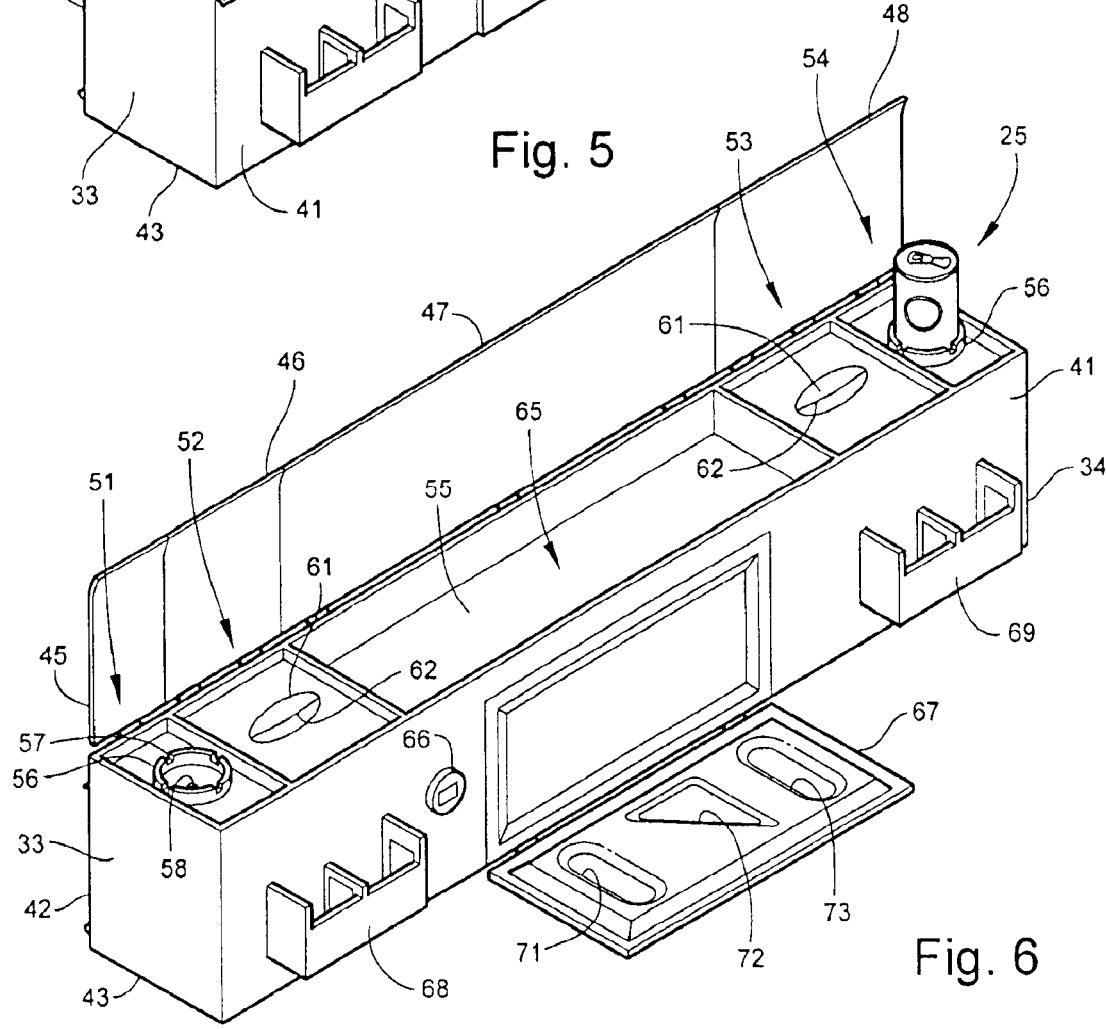
FIG. 6 is a perspective view of the dash box housing with the compartment lids and tray open.

The various compartments and other features and accessories of the dash box 10 are shown in FIGS. 5, 6, 7, and 8. Referring to FIGS. 5 and 6, the housing 25 has joined front, back and bottom walls 41, 42, and 43 formed with the end walls 33 and 34, and several pivoted lids 45, 46, 47, and 48 removably covering compartments 51, 52, 53, and 54 and a recessed cooler panel 55. Each of the compartments 51 and 54 has a top wall and a generally cylindrical holder 56 for carrying a beverage container, and defining perimeter notches 57 for holding burning cigarettes. A center hole 58 is formed in each holder 56 for disposing of cigarette butts into the compartment 51, 54. Each of the compartments 52 and 53 has a top wall including a flexible rubber mouth 61 defining a narrow slot 62 for receiving paper trash. The slots 62 contain the trash inside the compartments 52, 53 during operation of the cart 11. The trash and cigarette butt compartments 51–54 are preferably easily removable for convenient emptying. The recessed cooler panel 55 forms a shallow center compartment 65 for storing sandwiches, napkins, sun screen, gloves, towels, and loose items, such as golf balls and tees.

The front wall 41 of the housing 25 includes a detachable clock or timer 66, a fold-down tray 67, and divided holders 68 and 69 for cell phones, pencils, score cards, sun glasses, and the like. The tray 67 is pivotably attached to the front wall 41, and is movable between a closed stowed position, shown in FIG. 5, and an open in-use position, shown in FIG. 6. Preferably, the tray 67 has molded recessed areas 71, 72, and 73 for hotdogs and sandwiches.

Figure 7:
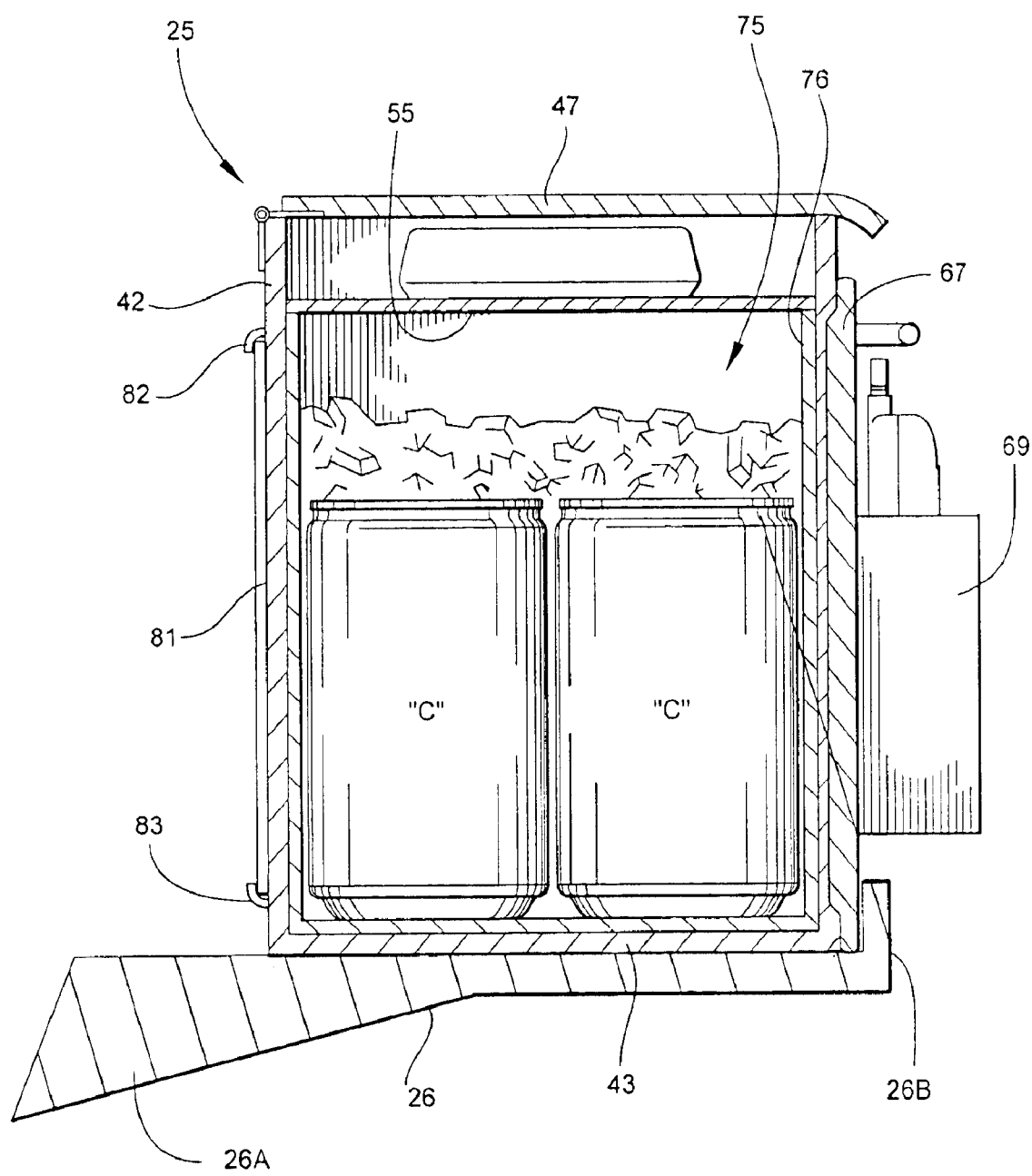
FIG. 7 is a cross-sectional view of the dash box taken through the cooler compartment.
Figure 8:
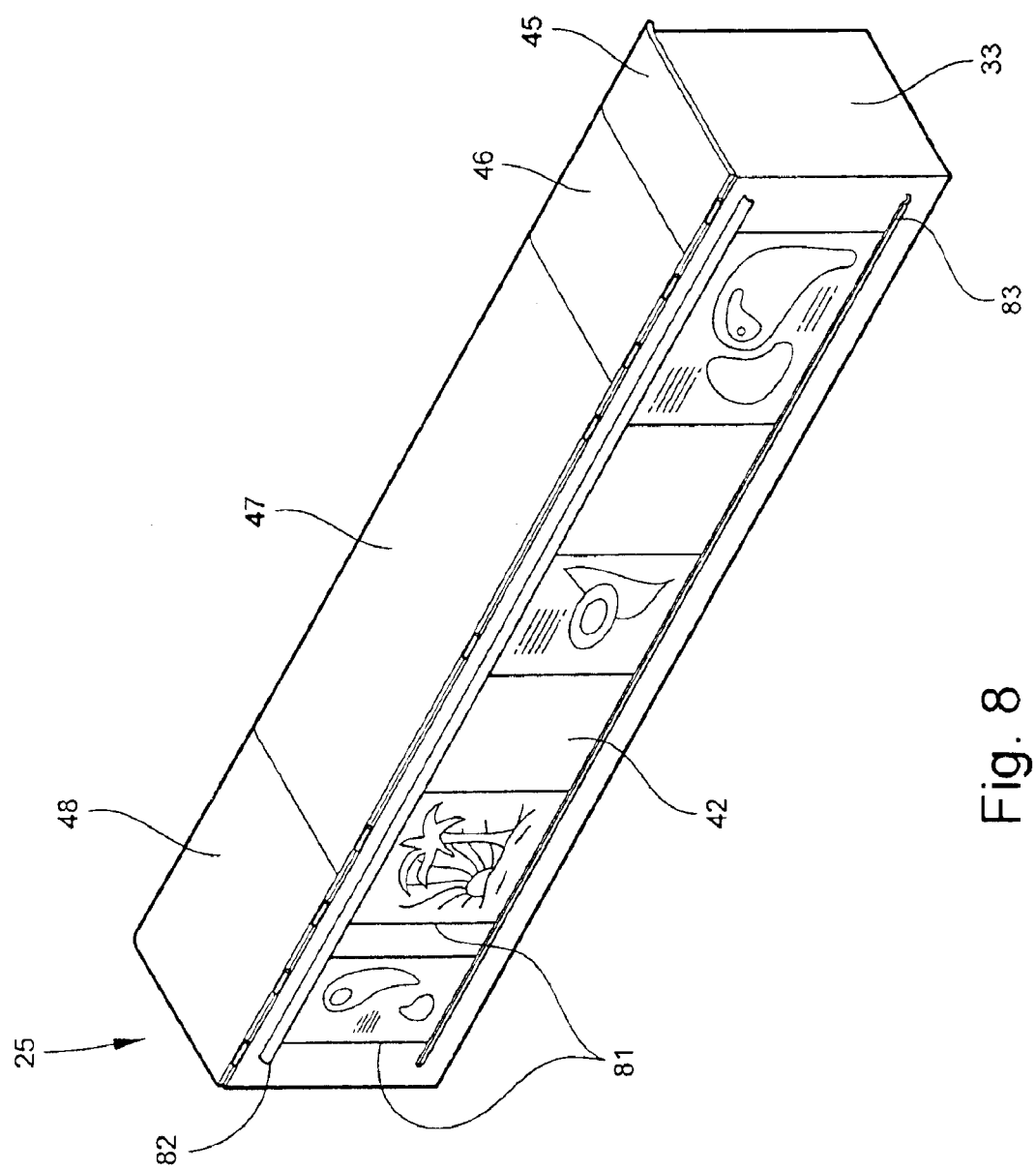
FIG. 8 is a perspective view showing the back wall of the dash box and the cart cards secured between the slide tracks.

The recessed cooler panel 55 is conveniently removable to access a cooler compartment 75, shown in FIG. 7. The cooler compartment 75 has insulated walls 76, and is especially applicable for storing ice and bottled or canned beverages "C". According to one embodiment, the cooler compartment 75 has sufficient capacity and support strength to hold as much as 50 pounds or more of contents.

The back wall 42 of the housing 25 provides surface area for securing removable cart cards 81 containing corporate advertising, golfer names, club notices, and other useful information. The cart cards 81 are slidably carried on vertically-spaced and laterally extending tracks 82 and 83 with respective open ends for conveniently receiving and removing the cards 81. In one application, one cart card 81 indicates and prominently displays the time at which the golfer(s) teed-off at the first hole. Based on this time, course rangers can quickly and easily determine the relative speed of play without approaching and/or interrupting the golfers. To further encourage ready golf, the clock or timer 66 may be set according to tee times and may provide an audible indicator at certain time intervals to help keep golfers on pace.

A dash box for a recreation vehicle is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

We claim:

1. A dash box for a recreation vehicle having an occupant area, a cowl extending forward of the occupant area, and first and second spaced-apart front support posts extending upwardly from the cowl, said dash box comprising:
    (a) a housing adapted for mounting between the first and second spaced-apart front support posts of the recreation vehicle, and comprising joined walls defining a plurality of divided compartments for holding and storing items, said compartments being readily accessed by an occupant seated in the occupant area of the recreation vehicle; and
    (b) a cowl-engaging stabilizing base carrying said housing and having a generally wedge-shaped portion adapted to fit within a space between the first and second spaced-apart front support posts and a rear edge of the cowl.

2. A dash box according to claim 1, wherein said cowl-engaging base comprises an upwardly turned front lip adapted to further secure said housing to the recreation vehicle.

3. A dash box according to claim 1, wherein said housing comprises opposing end walls adapted to reside adjacent respective support posts of the recreation vehicle.

4. A dash box according to claim 3, wherein the end walls of said housing comprise respective outwardly-extending flanges adapted for engaging the support posts to further secure said housing to the recreation vehicle.

5. A dash box according to claim 1, wherein said housing comprises at least one pivoted lid removably covering an open top of at least one of said plurality of compartments.

6. A dash box according to claim 1, wherein said plurality of compartments comprises an insulated cooler compartment.

7. A dash box according to claim 1, wherein said plurality of compartments comprises a trash compartment.

8. A dash box according to claim 7, wherein said trash compartment comprises a top wall defining a slot for receiving items within said trash compartment, and for containing the items inside said trash compartment during operation of the recreation vehicle.

9. A dash box according to claim 1, wherein said plurality of compartments comprises a telephone holder.

10. A dash box according to claim 1, wherein said plurality of compartments comprises an ash tray.

11. A dash box according to claim 1, wherein said plurality of compartments comprises a beverage holder defining a generally circular opening adapted for receiving a beverage container.

12. A dash box according to claim 1, and comprising a fold down tray attached to said housing and pivotable between an open in-use position and a closed stowed position.

13. A dash box according to claim 1, and comprising means for attaching an advertisement card to at least one wall of said housing.

14. In a recreation vehicle comprising an occupant area, a cowl extending forward of the occupant area, and first and second spaced-apart front support posts extending upwardly from the cowl, the improvement comprising a dash box, said dash box comprising:
    (a) a housing mounted between the first and second spaced-apart front support posts of said recreation vehicle, and comprising joined walls defining a plurality of divided compartments for holding and storing items, said compartments being readily accessed by an occupant seated in the occupant area of said recreation vehicle; and
    (b) a cowl-engaging stabilizing base carrying said housing and having a generally wedge-shaped portion adapted to fit within a space between the first and second spaced-apart front support posts and a rear edge of the cowl.

15. A recreation vehicle according to claim 14, wherein said housing comprises opposing end walls residing adjacent respective support posts of said recreation vehicle.

16. A recreation vehicle according to claim 15, and comprising means for removably mounting said housing to the first and second spaced-apart front support posts of said recreation vehicle.

17. A recreation vehicle according to claim 16, wherein said means for mounting comprises outwardly-extending flanges located on opposing end walls of said housing and engaging respective first and second spaced-apart front support posts of said recreation vehicle.

18. A recreation vehicle according to claim 17, wherein said means for mounting further comprises resilient C-shaped post clips applied to respective first and second spaced-apart front support posts and engaging the flanges of said housing to removably clamp said housing to said recreation vehicle.

19. A recreation vehicle according to claim 14, wherein said cowl-engaging base is formed separately from said housing.

* * * * *